United States Patent [19]
Okamura et al.

[11] Patent Number: 5,240,785
[45] Date of Patent: Aug. 31, 1993

[54] AIR CELL

[75] Inventors: Okiyoshi Okamura; Kazuaki Nakaura; Yoshihito Tamanoi, all of Waki, Japan

[73] Assignee: Koa Oil Company, Limited, Tokyo, Japan

[21] Appl. No.: 613,767

[22] PCT Filed: Mar. 31, 1990

[86] PCT No.: PCT/JP90/00445
§ 371 Date: Dec. 4, 1990
§ 102(e) Date: Dec. 4, 1990

[87] PCT Pub. No.: WO90/12428
PCT Pub. Date: Oct. 18, 1990

[30] Foreign Application Priority Data

Apr. 4, 1989 [JP] Japan .................................. 1-85391
Apr. 4, 1989 [JP] Japan .................................. 1-85392
Apr. 4, 1989 [JP] Japan .................................. 1-85393

[51] Int. Cl.$^5$ .............................................. H01M 4/00
[52] U.S. Cl. ........................................ 429/27; 429/28; 429/142; 429/247; 429/255
[58] Field of Search ................... 429/27, 28, 142, 247, 429/255

[56] References Cited

U.S. PATENT DOCUMENTS

| | | | |
|---|---|---|---|
| 3,378,406 | 4/1968 | Rosansky | 429/28 |
| 3,623,914 | 11/1971 | Carson | 429/46 |
| 4,078,124 | 3/1978 | Prentice | 429/142 |
| 4,626,482 | 12/1986 | Hamlen et al. | 429/27 |
| 4,871,627 | 10/1989 | Strong et al. | 429/27 |
| 4,885,217 | 12/1989 | Hoge | 429/27 |
| 4,908,281 | 3/1990 | O'Callaghan | 429/27 |
| 4,988,581 | 1/1991 | Wycliffe | 429/27 |
| 5,011,747 | 4/1991 | Strong et al. | 429/27 |

FOREIGN PATENT DOCUMENTS

| | | |
|---|---|---|
| 0227289 | 7/1987 | European Pat. Off. . |
| 1912382 | 10/1969 | Fed. Rep. of Germany . |
| 770930 | 9/1934 | France . |
| 54-035291 | 11/1979 | Japan .................................. 429/142 |

Primary Examiner—Mark L. Bell
Assistant Examiner—Anthony J. Green
Attorney, Agent, or Firm—Wenderoth, Lind & Ponack

[57] ABSTRACT

The present invention is an air cell of substantially an all-surface open type, which includes a case through which a plurality of windows for air ventilation are provided, a plurality of single cells which are disposed in the case, and an electrolyte bath which is provided at the bottom of the case and is filled with a water-absorbing material capable of absorbing and retaining an electrolyte. The air cell is characterized by being lightweight, compact and by exhibiting excellent power generating properties.

14 Claims, 4 Drawing Sheets

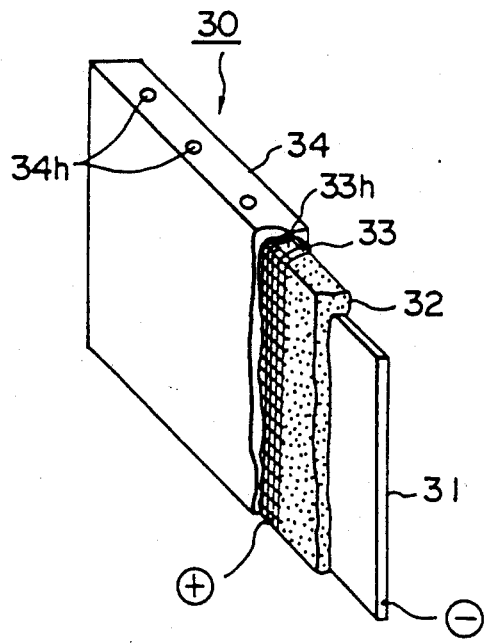
FIG. 3
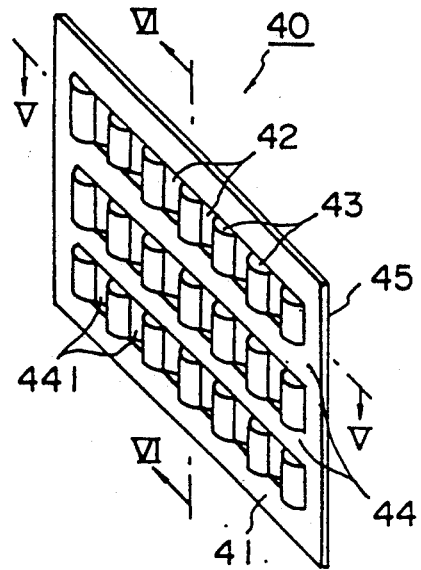
FIG. 4
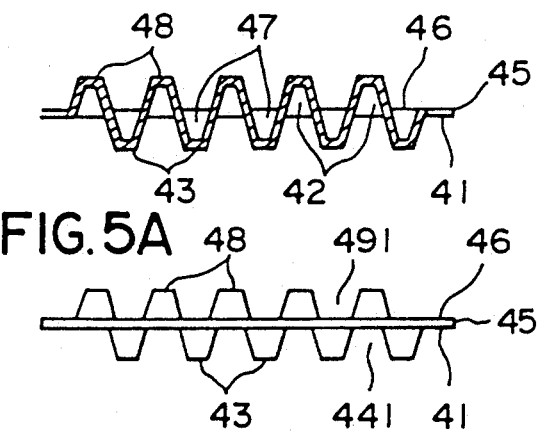
FIG. 5A
FIG. 5B
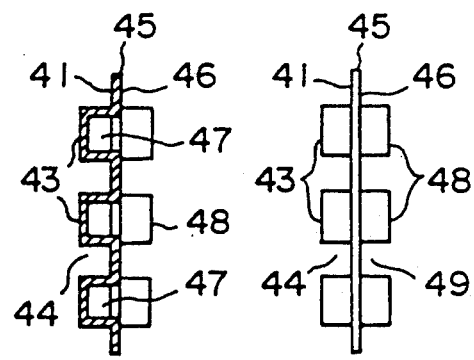
FIG. 6A   FIG. 6B

AIR CELL

BACKGROUND OF THE INVENTION

The present invention relates to an air cell, particularly to an all-surface open type air cell which is lightweight and exhibits excellent electric power generation.

Conventional air cells are constituted basically from a cathode, an anode and an electrolyte, and the containers of the cells are sealed to avoid the effluence of the electrolyte from the air cells.

For such conventional air cells, a firm sealed contained is used, so that the weight of the container occupies a considerable proportion of the total weight of the air cell. Thus, the air cell is rather heavy. Further, conventional air cells are designed on the assumption that they will only be mounted in such an orientation that the electrolyte will collect downwardly. Accordingly, if the air cell is laid or is used in an inclined orientation, the electrolyte will not be supplied properly to the cathode or the anode, and thus the generation of electric power may be reduced.

SUMMARY OF THE INVENTION

An object of the present invention is to provide an open type air cell in which the electrolyte will not flow from the cell in any orientation, which is lightweight, and exhibits excellent electric power generation.

The air cell according to the present invention is a substantially all-surface open type air cell and is basically characterized in that it comprises a water-absorbing material which can absorb and retain the electrolyte.

More particularly, the air cell according to the present invention comprises a case through which a plurality of ventilating windows are provided, a plurality of single cells disposed within the case, an electrolyte bath which is provided at the bottom of the case and in which an absorbing material capable of absorbing and retaining electrolyte is disposed.

In preferred embodiment of the present invention the single cell has a structure in which a cathode and an anode are integrated by a separator, which comprises a water-absorbing material capable of absorbing and retaining an electrolyte. Absorbing material in said electrolyte bath and said separator contact at least partly with each other. The electrolyte in the electrolyte bath is properly supplied to the separator by a capillary phenomenon. Furthermore, both the electrolyte and the separator comprise absorbing materials, so that the electrolyte charged is retained within the absorbing materials and the effluence of the electrolyte from the cell can be prevented.

BRIEF DESCRIPTION OF THE DRAWINGS

FIG. 3 is a perspective view, partly broken-away, of a single cell 30 of the air cell;

FIG. 4 is a perspective view of the spacer 40 of the air cell;

FIG. 5A is a longitudinal sectional view taken along line V—V of FIG. 4 and FIG. 5B is a plan view of the spacer shown in FIG. 4;

FIG. 6A is a transverse sectional view taken along line VI—VI of FIG. 4 and FIG. 6B is a right side view of the spacer shown in FIG. 4;

BEST MODE FOR CARRYING OUT THE INVENTION

According to the present invention, water-absorbing material for absorbing and retaining the electrolyte (electrolytic solution) of an air cell is provided in a bath of the cell so that the effluence of the electrolyte from the air cell is prevented without necessitating a sealing the cell. The air cell can therefore be an open type cell which exhibits excellent air permeability, and the total weight of the air cell is small. Accordingly, the open type air cell of the present invention can prevent the effluence of an electrolyte charged in the cell in any situation of use, is lightweight, and exhibits excellent electric power generation.

Figure 1:
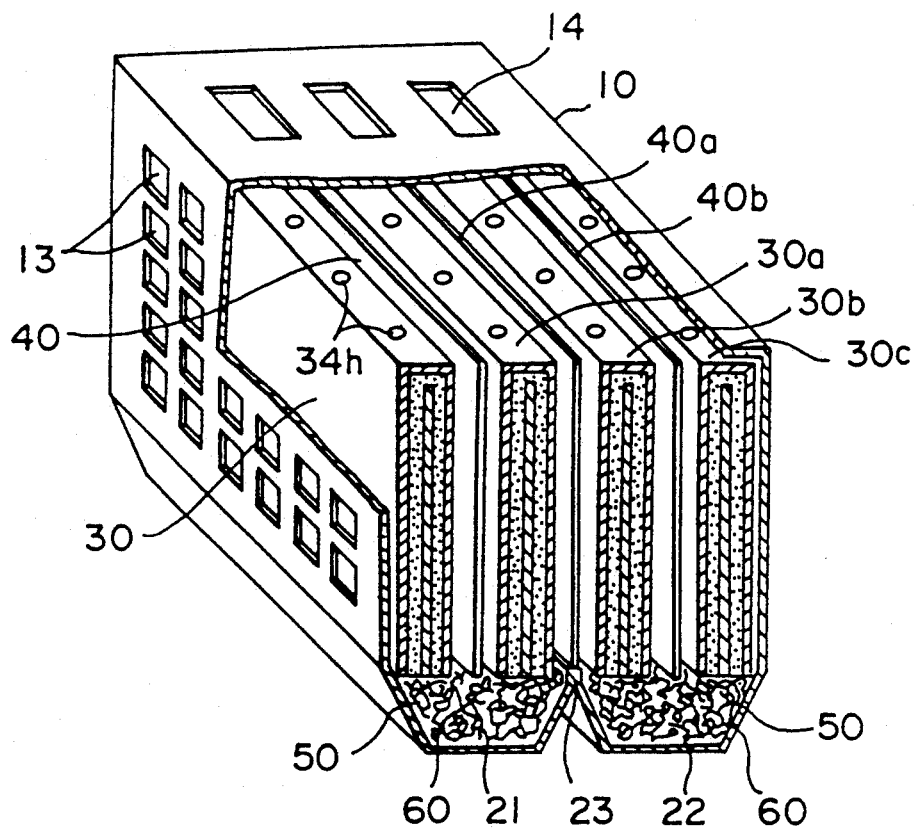
FIG. 1 is a perspective view, partly broken-away, of an embodiment of the air cell according to the present invention.

In the embodiment of FIG. 1, single cells 30, 30a, 30b and 30c, spacers 40, 40a and 40b, and a water-absorbing material 50 are disposed in the case 10 of the air cell, and an electrolyte 60 is absorbed and retained in the water-absorbing material 50.

Figure 2:
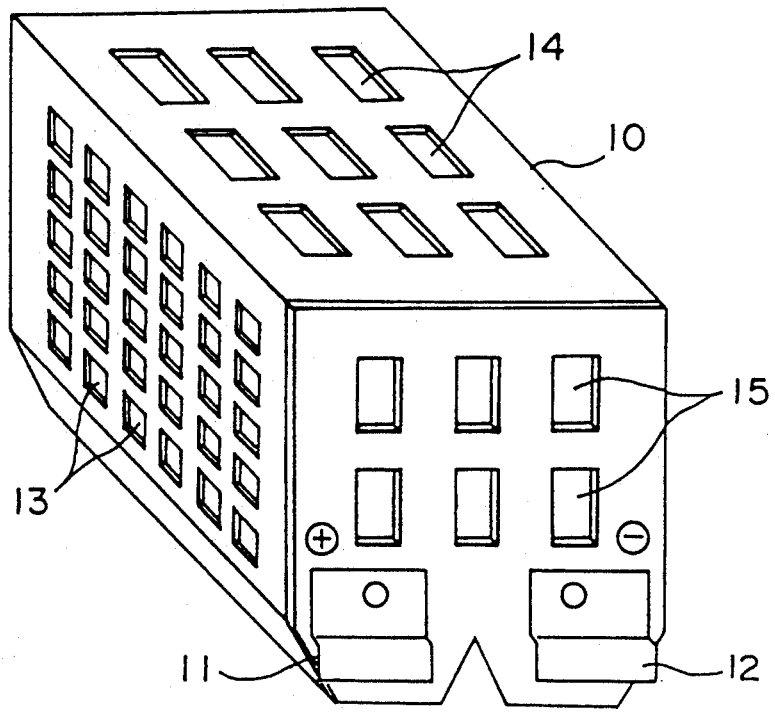
FIG. 2 is a perspective view which illustrates the case 10 of the air cell.

FIG. 2 illustrates the case 10 in the aforementioned embodiment. The front of the case 10 and the top and right sides thereof are provided with windows 13, 14 and 15 for ventilation, from which windows air is introduced into the case and supplied to the single cells 30, 30a, 30b and 30c. Windows are also provided in the rear and left sides of the case 10. A plus terminal 11 and a minus terminal 12 are disposed on the right side of the case 10. As described above, the air cell of the present invention has a cell case in which substantially all of the surfaces thereof are open.

The preferred embodiment of the present invention illustrated in FIG. 1, also includes a partition 23 separating the bath into compartments 21 and 22, a water-absorbing material 50 disposed in the compartments 21 and 22, and an electrolyte 60 which has been absorbed in the absorbing material 50 at the lower part of the case 10. The absorbing materials of a material which can absorb and retain an electrolyte. Specifically, pulps, synthetic fibers, natural fibers (including asbestos) and the like can be used.

FIG. 3 illustrates the structure of the single cell 30 in the above described embodiment. In this connection, the single cell 30 comprises an anode 31, a separator 32, a current collector 33 and a cathode 34.

The anode 31 can be of a magnesium alloy, a zinc alloy or an aluminum alloy. The anode 31 may be of any one of these alloys or a plurality of the alloys. A lead wire is connected to the terminal of the anode 31 by soldering or with the air of other means, and the lead wire is further connected to the − (minus) terminal 12.

The separator 32 comprises a water-absorbing material such as a glassy paper which has not been treated with a water-repellent, for electrically insulating a current collector 33 and the anode 31 from each other and absorbing the electrolyte comprising a KCl solution or a NaCl solution from the electrolyte bath by a capillary phenomenon thus wetting the anode 31 and the cathode 34. In this connection, the separator 32 may be made of water-absorbing materials such as glassy fibers or sheets of paper or the like instead of the glass paper.

The present invention is characterized in that the separator 32 and the water-absorbing material 50 in the electrolyte bath 21 shown in FIG. 1 contact each other over at least parts thereof so that the electrolyte is retained to prevent the effluence thereof and so that the electrolyte can be supplied to the separator efficiently.

The current collector 33 is in the form of a wire net or a mesh which is fabricated with a metal such as nickel, copper or the like and has a size of 340–330 mesh, so that air may pass through the current collector 33. It is disposed between the cathode 34 and the anode 31 and is in close contact with the cathode 34. To the current collector 33 is connected a lead wire by soldering or with the air of other means, and the lead wire is further connected to the + (plus) terminal 11.

The cathode 34 can be of a film comprising, as a main component, a petroleum graphite powder, and which film is porous and in close contact with the current collector 33. The cathode 34 can be fabricated by mixing the petroleum graphite powder with active carbon, adding a polytetrafluoroethylene dispersion to the mixture, stirring the resulting mixture, which is then coated on the current collector 33 in the form of a thin film, and heating the film. When the cathode 34 is to be in close contact with the current collector 33 in the form of a film, it can be formed by electrostatic deposition or other methods.

When the single cell 30 is fabricated, a lead wire is connected to the terminal of the plate-like anode 31 by soldering and the lead wire is also connected to the terminal of the current collector 33. The separator 32 in the form of a plate is then folded over, and the anode 31 is inserted between the folded halves. The cathode 34 which is in close contact with the current collector 33 and comprises a film having as a main component a petroleum graphite powder is folded over, and the separator 32, which has the anode 31 inserted between the folded halves thereof, is in turn inserted into the folded cathode 34.

Symbols 33h and 34h designate perforations through which gases are allowed to disperse.

The structure of and method of producing the single cells 30a, 30b and 30c are similar to those of the single cell 30.

Next, the spacer used in the present invention will be described with reference to FIGS. 4–6.

In general, when an air cell is constructed of a combination of a plurality of single cells, a sufficient amount of air must be supplied to respective ones of the single cells. Therefore, a certain spacing must be kept between adjacent single cells. A spacer is provided for maintaining the spacing. The reason for providing such a spacing is to improve the air flow and thus to increase the power output of the cell. The spacer therefore must ensure an appropriate air permeation. During the practical use of the air cell, the spacer must have a certain strength in order to maintain the above-described predetermined spacing between the cells. Furthermore, the air cell should be lightweight. Foamed materials are impractical because of their poor resistance against electrolytes in spite of their advantage of being lightweight. Thus, it could be considered to make a spacer of a material having a resistance to chemicals superior to that of foamed materials, providing the material in a predetermined thickness, and providing a plurality of perforations (such as slits or the like) in the material. However, an air cell reinforced in such a manner in order to maintain a sufficient strength as well as to facilitate a certain extent of air permeation is rather heavy and expensive.

In consideration of the above, the present invention uses a spacer which comprises a plate having both front and back uneven surfaces. The spacer is described in detail below.

The spacer 40 comprises a plastic, such as polypropylene or the like, plate 45 having uneven major surfaces (convexities and concavities) and which has an insulating property. The spacer 40 has concavities 42, convexities 43 and pathways for air 44 and 441 at the front side 41 thereof, and concavities 47, convexities 48 and pathways for air 49 and 491 at the back side 46 thereof. The spacer 40 is formed by vacuum molding and has a slightly corrugated form providing the above-described unevenness. The concavities 42 on the front side 41 correspond to the convexities 48 on the back side, and the convexities 43 on the front side 41 correspond to the concavities 47 on the back side.

While the unevenness of the spacer 40 is in the form of circular arcs in FIG. 4, the corresponding corrugations in FIGS. 5 and 6 are in the form of trapezoids and rectangles, respectively. Thus, the concavities 42 and 47 and the convexities 43 and 48 may be in the form of circular arcs, trapezoids or other forms such as triangles. However, because the spacer 40 is disposed between the single cells 30 and 30a and exerts a force on both the single cells 30 and 30a for maintaining the spacing between the single cells 30 and 30a at a predetermined distance, the crests of the abovementioned convexities preferably form a face but not a point or a line. Methods other than vacuum molding may also be used to form the spacers. When the spacer 40 is disposed between the two cells which are connected in parallel to each other, the spacer 40 is not required to have an insulating property. The structure of and method of producing the spacers 40a and 40b are similar to those of the spacer 40.

As described above, the spacer according to the present invention comprises a plate which has uneven front and back surfaces so that a sufficient amount of air can permeate the air cell and so that a sufficient strength is ensured during practical usage. The spacer also has an advantage in that it is not costly to produce.

Next, the operation of the air cell according to the present invention will be described.

In general, when the air cell is not in use, the cathode 34 and the anode 31 are not in contact with the electrolyte 60 comprising KCl or the like, that is, the electrolyte 60 is not supplied to the water-absorbing material 50. The electrolyte 60 is supplied appropriately for the first time when the air cell is used. In such a manner, the power will not be decreased due to a natural discharge prior to the use of the cell, so that the shelf life of the cell is enhanced and the air cell is very useful as an electric source in an emergency.

When electromotive force is required, the electrolyte 60 is supplied through the windows 13, 14 and 15 of the case 10 in a predetermined amount. Thus, the following reactions take place at the cathode 34:

$$1/2 O_2 + H_2O + 2e^- \rightarrow 2OH^-$$

or $$O_2 + H_2O + 2e^- \rightarrow O_2H^- + OH^-$$

$$O_2H^- \rightarrow OH^- + 1/2 O_2$$

On the other hand, when the anode 31 is made of a Mg alloy, the following reactions occur:

$$Mg + 2OH^- \rightarrow MgO + H_2O + 2e^-$$

$$Mg + 2H_2O \rightarrow Mg(OH)_2 + H_2 \uparrow \text{ (side reaction)}$$

The above-described reactions are similar to those of the conventional cells. When a load is connected to the air cell, the electrons $e^-$ produced at the anode 31 flow through the load and reach the cathode 34 at which the electrons $e^-$ are consumed as described above. In this way, the current flows from the cathode to anode 31 through the load.

In the above-described embodiment, the spacer 40 is interposed between the single cells 30 and 30a and spaces the single cells apart at a predetermined distance so that the amount of air introduced from outside of the case 10 and passing through the pathways 44, 441, 49 and 491 provided in the spacer 40 will be sufficient for the above-described reactions at the anode 34 to proceed. The cathode 34, the current collector 33 and the separator 32 exhibit good permeability to air so that the air passing through the pathways 44, 441, 49 and 491 is also supplied to the anode 31 in an amount sufficient for the above-described reactions at the cathode 31 to occur satisfactorily.

The pathways of air in the spacer 40 are provided in the transverse and longitudinal directions as shown in FIG. 4. While the air pathway 44 extending in the transverse direction at the front side 41 is easily observed from FIG. 4, the air pathway 441 in the longitudinal direction is formed along the line between the flat portion of the surface a the front side 41 and the concavities 42. The air pathway 49 extending in the transverse direction on the back side 46 is similar to the air pathway 44, and the air pathway extending in the longitudinal direction 491 is formed along the line between the flat portion of the surface at the back side 46 and the concavities 47.

As the spacer 40 comprises plastics or the like, it is lightweight and inexpensive, and it exhibits satisfactory strength due to the concavities and convexities 42 43, 47 and 48.

Figure 7:
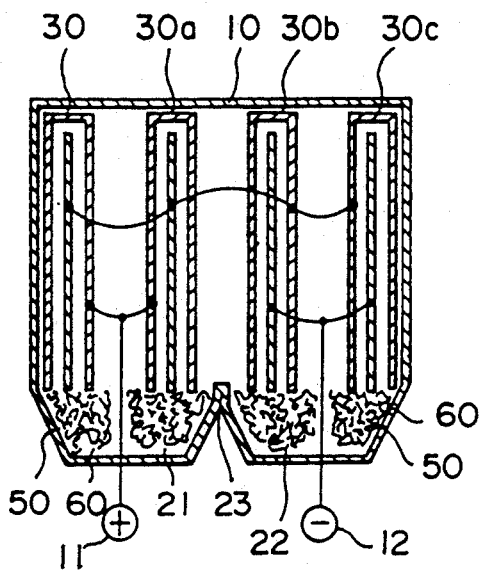
FIG. 7 is a schematic of another embodiment of the present invention in which the single cells are connected in series and two compartments are provided for receiving electrolyte.
Figure 8:
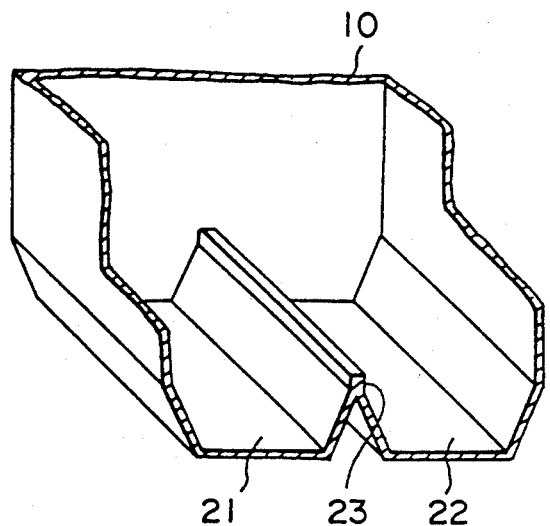
FIG. 8 is a perspective view of only a lower part of the case 10 in the embodiments illustrated in FIGS. 1 and 7.

In the embodiment of FIG. 7, the spacers 40, 40a and 40b are omitted for the convenience of description.

A water-absorbing material 50 is stored in the compartment 21, and an electrolyte 60 is absorbed by and retained in the water-absorbing material 50. The single cells 30 and 30a are disposed on the water-absorbing material 50, and these single cells 30 and 30a are connected in parallel to each other. A water-absorbing material 50 is stored in the compartment 22, and the electrolyte 60 is absorbed by the water-absorbing material 50. The single cells 30b and 30c are disposed on the water-absorbing material 50, and these single cells are connected in parallel to each other. Thus, the above-described single cells connected in parallel are further connected in series to each other.

In this regard, although the electrolytes fill the compartments 21 and 22, respectively, the electrolytes in the compartments 21 and 22 should not be mixed with each other. In other words, the electrolyte 60 should not be supplied in such an amount that it will flow over the partition 23.

Figure 10:
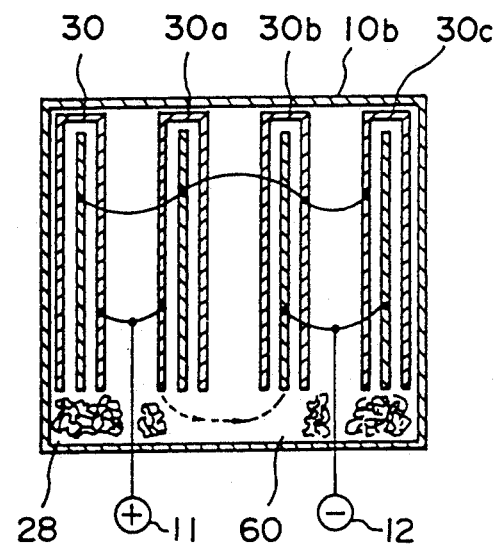
FIG. 10 is a schematic of an example of an air cell in which electrolyte is shared by a plurality of cells connected in series.

In this way, it is possible to prevent current from flowing between the single cells in the case 10 through the electrolyte 60, i.e., to prevent the leaking of the current (short-circuit) in the case 10. In other words, as shown in FIG. 10, when an electrolyte 60 supplied in a bath 28 is shared by a plurality of single cells, which are connected in series with each other, a leakage current flows as shown by the dotted line in FIG. 10. On the other hand, in the case of FIG. 7, electrolytes supplied to each of the single cells which are connected in series with each other are respectively received in different compartments, so that the current does not flow through the electrolyte and current leakage does not take place.

Figure 9:
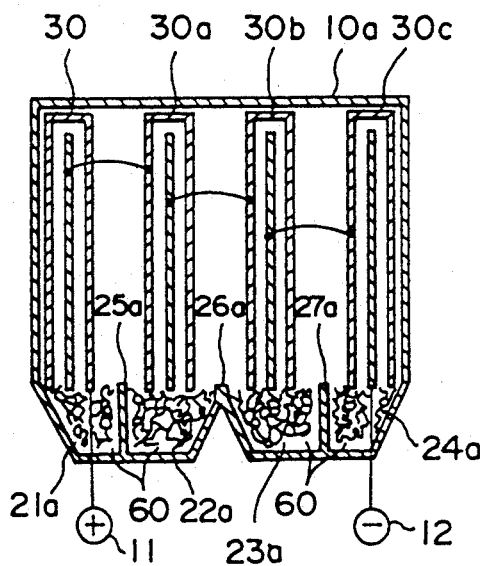
FIG. 9 is a schematic of another embodiment of the present invention in which the single cells are connected in series and four compartments are independently provided for receiving electrolyte.

FIG. 9 illustrates another embodiment in which all the single cells shown in the embodiment of FIG. 1 are connected in series to each other and four individual compartments for receiving the electrolyte are provided.

In this regard, the spacers 40, 40a and 40b are omitted in FIG. 9 for the convenience of description. In this embodiment, partitions 25a, 26a and 27a are provided for separating compartments 21a, 22a, 23a, and 24a from one another. The singles cells 30, 30a, 30b and 30c are disposed of the compartments 21a, 22a, 23a and 24a, respectively.

The aforementioned leakage current is prevented by separating the individual compartments corresponding to the number of the single cells to be connected in series (or the number of sets of single cells to be connected in series). It is needless to say that the number of the compartments may be other than 2 or 4.

Furthermore, if the supplied amount of the electrolyte 60 is limited to ensure that it will not flow over the partitions 25a, 26a or 27a, the aforementioned leakage current is prevented (even if a water-absorbing material is not stored in the bath) and the electric power can be taken out efficiently.

However, in FIGS. 1, 7 and 9, the water-absorbing material 50 is stored in the respective compartments, and the electrolyte 60 is absorbed and retained in the water-absorbing material 50. In this way, the electrolyte 60 in the water-absorbing material 50 is absorbed by the separator 32 of the single cell 30, and is aspirated to a higher part of the separator 32 by a capillary phenomenon and is finally supplied to all of the surfaces of the anode 31 and the cathode 34.

Even if the case 10 falls down by accident, the electrolyte 60 is prevented from scattering to the other parts of the cell or from flowing from the cell due to the ability of the water-absorbing material 50 to hold the electrolyte. Accordingly, problems can be avoided even if the case 10 is mounted or used in an inclined orientation. According to the present invention, the water-absorbing material 50 retains the electrolyte 60 even if the case 10 falls down, and the electrolyte 60 can be supplied continuously to the anode 31 and the cathode 34 through the separator 32. Therefore, the generation of electric power will not cease even if the air cell falls down violently.

In this way, according to the present invention, the case 10 does not have to be so sealed and the weight of the air cell otherwise attributed to sealed structure is eliminated. In other words, the air cell of the present invention is substantially of an all-surface open type and thus facilitates excellent air permeation and also exhibits improved operation.

Figure 11:
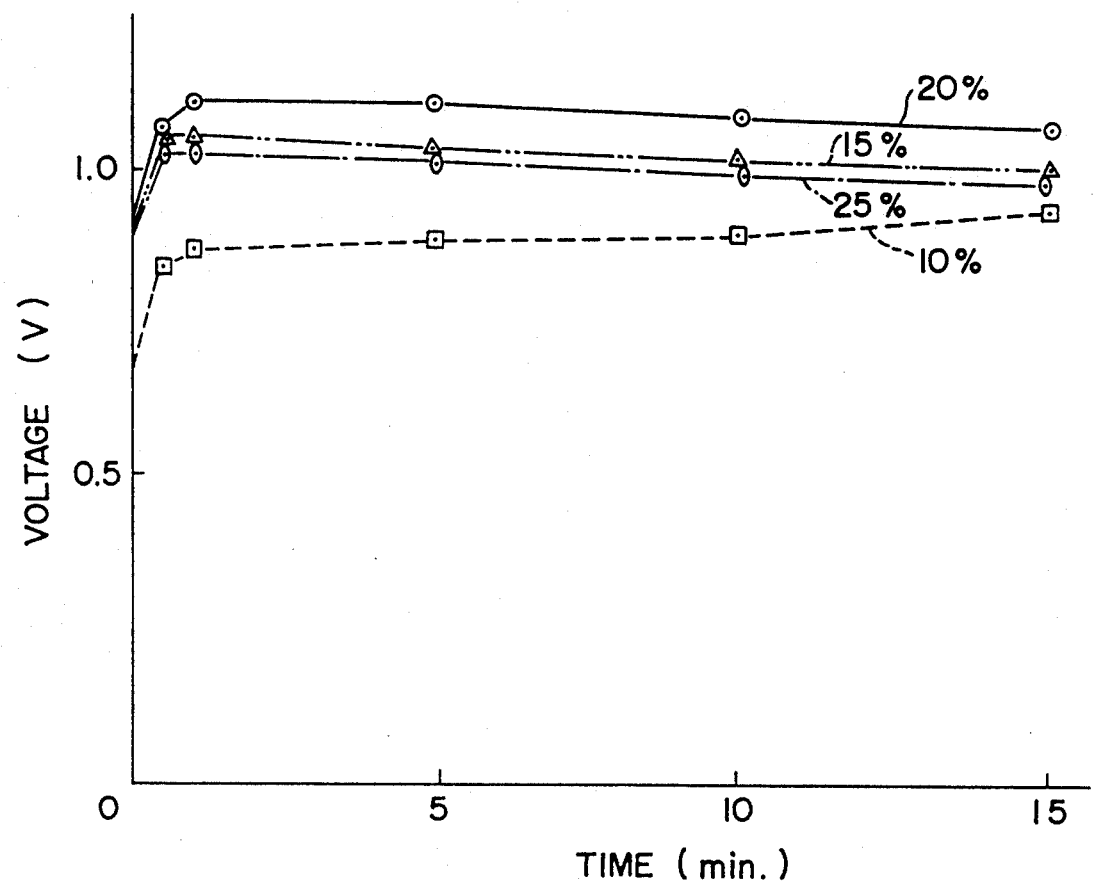
FIG. 11 is a graph which shows the variation of an output voltage while a load current is kept at 1A.

FIG. 11 is a graph which demonstrates the variation of the output voltage while maintaining the load current at 1A in the embodiments described above.

In this case, the anode 31 is made of a magnesium alloy and, as is apparent from the graph, has a high output voltage when the electrolyte 60 has a KCl concentration in the range from 15% by weight to 25% by weight.

In the above-mentioned embodiment, although KCl solution was used as the electrolyte 60, other electrolytes such as sea water or other brines may also be used.

In addition, although in the aforementioned embodiments the cathode has been described as being of petroleum graphite powder, the cathode may be of graphite materials other than petroleum powder.

The air cell of the present invention is substantially an open type, successfully prevents the electrolyte from scattering to the outside of the air cell, is lightweight, and can generate electric power even if the air cell has fallen.

Therefore, the air cell of the present invention can be widely used for various applications such as an electric source in an emergency when the power of a battery for an automobile is lowered, as a power source for a model airplane, or as an electric source useful for leisure activities, e.g., camping, fishing or the like.

We claim:

1. An air cell comprising:
   a case through which a plurality of windows for air ventilation are provided;
   a plurality of single cells which are disposed in said case; and
   an electrolyte bath which is provided at the bottom of said case, and a water-absorbing material capable of absorbing and retaining an electrolyte, said water-absorbing material filling said bath.

2. An air cell according to claim 1, wherein each of said single cells has a cathode, an anode and a separator interposed between and integrating said cathode and said anode.

3. An air cell according to claim 2, wherein said separator comprises a water-absorbing material which can absorb and retain an electrolyte.

4. An air cell according to claim 2, wherein each of said single cells also has a current collector interposed between said cathode and said separator.

5. An air cell according to claim 2, wherein said separator contacts said water-absorbing material filling said electrolyte bath.

6. An air cell according to claim 1, wherein said electrolyte bath has a partition separating the bath into respective compartments.

7. An air cell according to claim 1, wherein said electrolyte bath is divided into a plurality of compartments each associated with only one of said single cells, and each of said single cells associated with a different one of said compartments are connected in series.

8. An air cell according to claim 1, wherein said electrolyte bath is divided into a plurality of compartments associated with two or more of said single cells, and said single cells which are associated in common with a said compartment are connected in parallel.

9. An air cell according to claim 1, wherein said electrolyte bath is divided into a plurality of compartments associated with said plurality of single cells, each of said single cells associated with a different one of said compartments are connected in series, and said single cells which are associated in common with a said compartment are connected in parallel.

10. An air cell according to claim 1, and further comprising spacers interposed between adjacent ones of said plurality of single cells.

11. An air cell according to claim 1, wherein each of said spacers comprises a plate having uneven front and back surfaces.

12. An air cell according to claim 11, wherein said surfaces of the plate define concavities and convexities with the concavities formed on the back side of the convexities.

13. An air cell according to claim 6, wherein said water-absorbing material comprises discrete portions of water-absorbing materials disposed in the respective partitioned compartments in a non-contact state with respect to each other.

14. An air cell according to claim 1, wherein at least one of said water-absorbing material and said separator comprises one or a mixture of two or more of the materials selected from the group consisting of pulps, synthetic fibers, natural fibers, and glassy papers.

* * * * *